Oct. 10, 1950     W. F. GINSBERG     2,525,540
LAWN SPRINKLER
Filed June 6, 1949
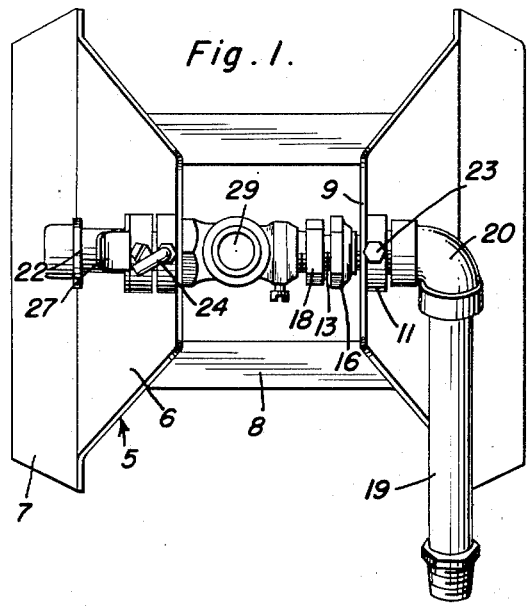
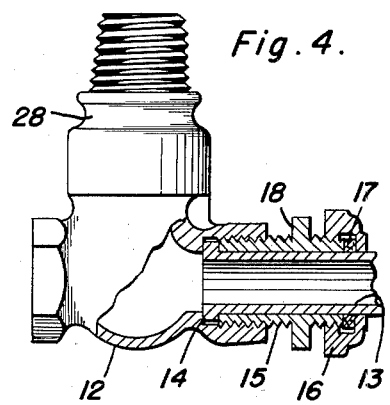
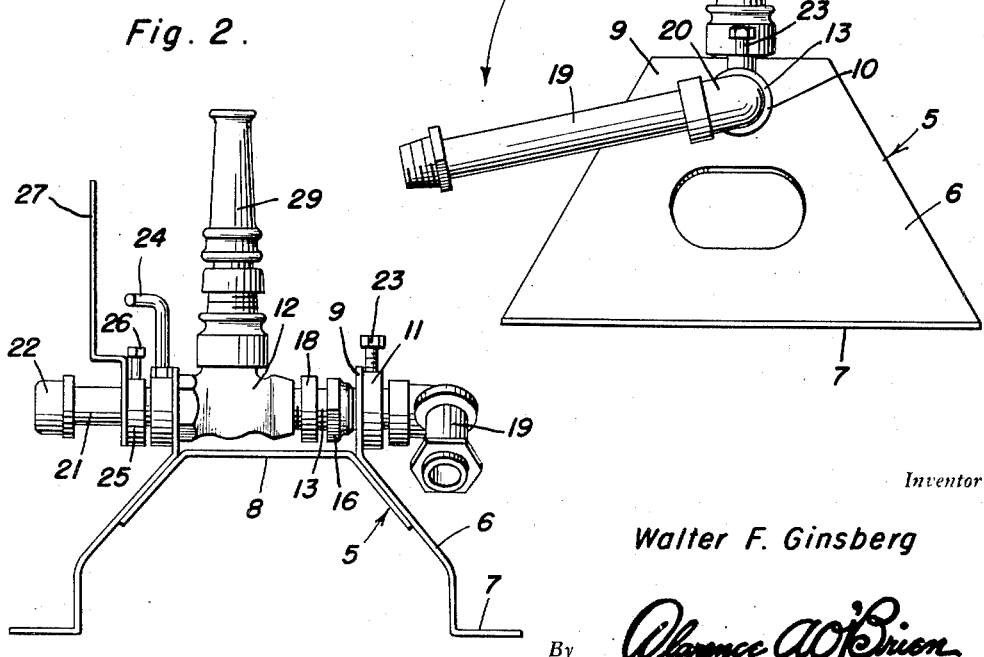
Inventor
Walter F. Ginsberg

Patented Oct. 10, 1950

2,525,540

UNITED STATES PATENT OFFICE 2,525,540

LAWN SPRINKLER

Walter F. Ginsberg, Anaconda, Mont.

Application June 6, 1949, Serial No. 97,440

1 Claim. (Cl. 299—73)

The present invention relates to new and useful improvements in lawn sprinklers, and more particularly to a novel stand construction for the sprinkler and by means of which the sprinkler may be supported in an elevated position above the ground and at a desired angle.

An important object of the invention is to provide a connection for a hose nozzle or other type of conventional sprinkler or spray head, the nozzle or sprinkler connection including a pipe section rotatably supported in a horizontal position in a stand with means for locking the pipe section in a rotatably adjusted position to adjust the angle of the nozzle or sprinkler.

A further object is to provide a device of this character of simple and practical construction, which is efficient and reliable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 2 is a side elevational view;

Figure 3 is a similar view taken at right angles to Figure 2; and

Figure 4 is an enlarged sectional view of the packing nut for connecting the rotary pipe to the sprinkler.

Referring now to the drawing in detail wherein, for the purpose of illustration, I have disclosed a preferred embodiment of the invention, the numeral 5 designates generally a substantially U-shaped stand arranged in inverted position and constructed of a pair of legs 6 of sheet metal having outwardly extending flanges or feet 7 at their lower ends for resting on the ground and rigidly connected to each other adjacent their upper ends by a pair of spaced metal straps 8 having the ends of the straps welded or otherwise suitably secured to the legs.

The upper ends of the legs project upwardly above the straps 8 to provide a pair of upright flanges 9 having aligned openings 10 therein provided with apertured bosses or collars 11 on the outer surfaces of flanges 9, the bosses or collars being integrally cast with or otherwise secured to the flanges.

A T-fitting 12 is positioned between flanges 9 with a pipe section 13 secured in one end of the T-fitting by means of a flange 14 on the inner end of the pipe section and held in the T-fitting by an externally threaded coupling 15 threaded into the fitting and bearing against the flange 14 as shown in Figure 4 of the drawing. A packing nut 16 is threaded on the outer end of the coupling 15 with a washer or packing 17 positioned between the nut and the outer end of the fitting. A wrench or tool engaging flange 18 is formed at the central portion of fitting 15 for tightening the same in the T-fitting 12.

The pipe section 13 extends outwardly through the opening in one of the flanges 9 and collars 11 at one side of the stand 5 and the outer end of pipe section 13 is connected to a pipe section 19 by an elbow 20, the pipe section 19 being suitable for attaching to a hose (not shown).

A pipe section 21 is also attached to the other end of the fitting 12 and projects outwardly through the other of the upstanding flanges 9 and collars 11, the outer end of pipe section 21 being capped, as shown at 22.

The pipe sections 13 and 21 are secured in a rotatably adjusted position in the flanges 9 and collars 11 by set screws 23 threaded through the collars, the set screw for pipe section 21 preferably being formed with an angular handle 24.

A collar 25 is also secured to pipe section 21 by means of a set screw 26 and a handle 27 is suitably secured to collar 25 to rotate the pipe sections 13 and 21 in the flanges 9 and collars 11 to adjust the angle of outlet end 28 of T-fitting 12.

In the operation of the device, a conventional type of hose nozzle 29, or other form of hose sprinkler is secured to the outlet end 28 of T-fitting 12 and the fitting connected to a garden hose. Water is thus sprayed from nozzle or sprinkler 29 and the angle of the nozzle may be adjusted by loosening set screws 23 and 24 and turning pipe sections 13 and 21 by means of handle 27 and the set screws again tightened to hold the nozzle in its desired angularly adjusted position.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A lawn sprinkler comprising a stand composed of a pair of sheet metal legs, a cross bar rigidly connecting the legs to each other, a pair of upstanding flanges rising from the legs above the cross bar, collars fixed to the sides of the flanges, a horizontal pipe rotatably supported in the flanges and collars, a spray head connected to the pipe between the flanges, and set screws carried by the collars securing the pipe in rotatably adjusted position in the flanges to angularly adjust the spray head.

WALTER F. GINSBERG.

REFERENCES CITED

The following references are of record in the file of this patent:

UNITED STATES PATENTS

| Number | Name | Date |
|---|---|---|
| 1,129,713 | Nikola | Feb. 23, 1915 |
| 1,155,620 | Scheick | Oct. 5, 1915 |

FOREIGN PATENTS

| Number | Country | Date |
|---|---|---|
| 2,630 of 1877 | Great Britain | Sept. 29, 1877 |
| 119,165 | Switzerland | Mar. 1, 1927 |